J. D. PIERCE.
CAR-STARTER.

No. 170,490. Patented Nov. 30, 1875

WITNESSES:

INVENTOR:
James D Pierce

UNITED STATES PATENT OFFICE.

JAMES D. PIERCE, OF MILWAUKEE, WISCONSIN, ASSIGNOR OF ONE-HALF HIS RIGHT TO JOHN B. SMITH, OF SAME PLACE.

IMPROVEMENT IN CAR-STARTERS.

Specification forming part of Letters Patent No. 170,490, dated November 30, 1875; application filed September 10, 1875.

*To all whom it may concern:*

Be it known that I, JAMES D. PIERCE, of Milwaukee, in the county of Milwaukee, in the State of Wisconsin, have invented certain Improvements in Car-Starters, of which the following is a specification:

The object of my invention is to start cars from a dead stop; and it consists in an apparatus by which the leverage is brought to bear directly on a car, and thus enable a horse or horses to start it easily, which, when once started, will move without trouble; or a man may operate it, if desired.

Figure 1:
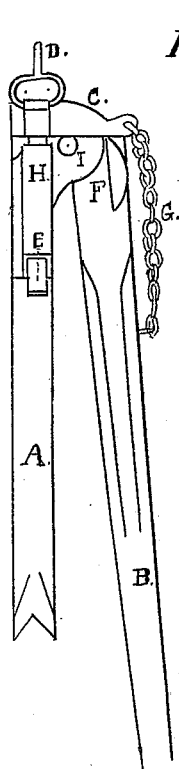
Figure 2:
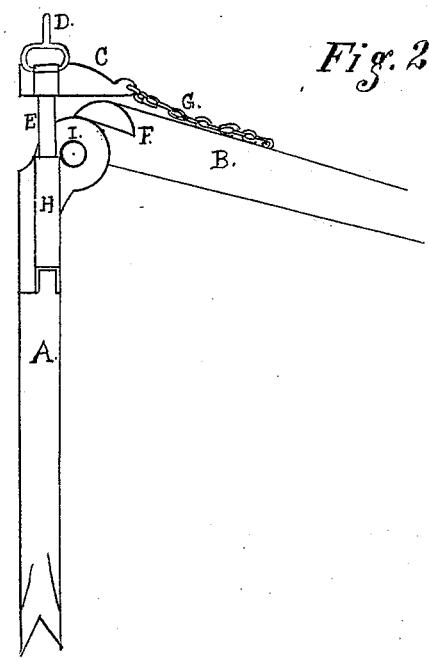

Figure 1 is the invention closed up, ready to start a car; and Fig. 2, a view of same partly opened, showing its movement.

A is the fulcrum of the starter, on the ground or rail, and the movable head against the car, or ready to be placed against it; B, the lever, with which the starter is operated; C, the head, which is placed against the car to be started; D, a hook on the head, to be driven into the car to hold the head up to the same; E, a slide connected to head C; F, a raised portion of lever B, which works against the head C and throws the same out, and with it moves the car ahead. G is a chain, for connecting the head to the lever B; H, a block on top of fulcrum A, in which the slide E works; I, a joint coupling A and B together.

The operation is as follows:

The head C is put against the end of a car, and the hook D thrust in. The foot of fulcrum A, being then placed on the rail, and the lever B carried out, the head C is forced upward, and the car moved ahead. The lever B is then brought back, and chain F secured to the head C, and lever B will pull the fulcrum and lever B forward, and the car can be moved another stretch; and when the starter is used for starting a car on the road the starter is secured to the car, and the head C is arranged so as to strike against a ratchet-wheel on the axle-tree of the car, and when the lever B is pulled out the axle-tree and wheels will be turned and the car moved ahead.

I claim as my invention—

Fulcrum A, lever B, head C, and slide E, all in combination, substantially as described.

JAMES D. PIERCE.

Witnesses:
   J. B. SMITH,
   A. SCHALTENBERG.